United States Patent
Atmur et al.

[11] Patent Number: 5,730,096
[45] Date of Patent: Mar. 24, 1998

[54] HIGH-EFFICIENCY, LOW-POLLUTION ENGINE

[75] Inventors: Steven Donald Atmur, Riverside; Thomas Edward Strasser, Corona; Philip Shacter, Whittier; Michael James Hagen, Irvine, all of Calif.

[73] Assignee: Northrop Grumman Corporation, Los Angeles, Calif.

[21] Appl. No.: 744,521

[22] Filed: Nov. 5, 1996

Related U.S. Application Data

[62] Division of Ser. No. 515,604, Aug. 16, 1995, Pat. No. 5,638,779.

[51] Int. Cl.$^6$ ........................................... F02B 75/08
[52] U.S. Cl. ............................................... 123/193.5
[58] Field of Search ........................... 123/193.5, 193.3, 123/193.6, 195 R

[56] References Cited

U.S. PATENT DOCUMENTS

| | | | |
|---|---|---|---|
| 4,328,772 | 5/1982 | Heydrich et al. | 123/193.3 |
| 4,341,826 | 7/1982 | Prewo et al. | 123/193.1 |
| 4,419,971 | 12/1983 | Nakamura et al. | 123/193.2 |
| 4,523,554 | 6/1985 | Ryu | 123/193.2 |
| 4,524,498 | 6/1985 | Hartsock | 92/212 |
| 4,633,823 | 1/1987 | Haas et al. | 123/41.69 |
| 4,779,576 | 10/1988 | Bidwell | 123/25 P |
| 4,781,157 | 11/1988 | Wade et al. | 123/193.5 |
| 4,781,158 | 11/1988 | Bauer et al. | 123/41.69 |
| 4,791,896 | 12/1988 | Bidwell | 123/193.3 |
| 4,796,572 | 1/1989 | Heydrich | 123/193.2 |
| 4,840,154 | 6/1989 | Fingerle et al. | 123/193.5 |
| 4,852,542 | 8/1989 | Kamo et al. | 123/193.5 |
| 5,042,364 | 8/1991 | Okamura et al. | 123/193.6 |
| 5,055,435 | 10/1991 | Hamanaka et al. | 501/134 |
| 5,063,881 | 11/1991 | Kawamura | 123/1 A |
| 5,333,583 | 8/1994 | Matsuura | 123/73 C |

*Primary Examiner*—David A. Okonsky
*Attorney, Agent, or Firm*—Terry J. Anderson; Karl J. Hoch, Jr.

[57] ABSTRACT

An internal combustion engine of either two-cycle or four-cycle construction including a block having at least one cylinder bore therein having sidewalls carrying a liner of a structural fiber reinforced ceramic matrix composite material disposed in sealed fiber reinforced sliding relationship within the cylinder bore, and a cylinder head sealing atop end of the cylinder bore to form a closed combustion chamber in combination with the piston. The cylinder head also has the structural fiber reinforced ceramic matrix composite material disposed on an inner surface thereof facing the combustion chamber. The preferred engine is a two-cycle engine having an externally scavenged intake system and an oil sump lubricating system thereby eliminating the need to separately mix or inject lubricating oil. Higher operating temperatures and closer tolerances allow higher fuel efficiency and less pollutant production. A preferred structural fiber reinforced ceramic matrix composite material and the method of making same is also disclosed.

17 Claims, 7 Drawing Sheets

HIGH-EFFICIENCY, LOW-POLLUTION ENGINE

This is a division of application Ser. No. 08/515,604, filed Aug. 16, 1995 and now U.S. Pat. No. 5,638,779.

BACKGROUND OF THE INVENTION

1. Technical Field

This invention relates to internal combustion engines and, more particularly, to a multi-fuel two-cycle engine employing structural fiber reinforced ceramic matrix composite (FRCMC) internal components that decrease the heat loss during the combustion process and increase the overall efficiency of the engine. The increases in efficiency result in increased power output, decreased fuel consumption, and reduced polluting exhaust emissions. It also relates to methods of making fiber reinforced ceramic matrix composite materials which are breakage resistant and highly suitable for use in the construction of components employed in a high temperature internal combustion engine.

2. Background Art

The operation of a typical prior art four-cycle internal combustion engine is shown in FIGS. 1 through 4. There are one or more pistons 10 moving up and down within a cylinder 12. The pistons 10 are connected by a connecting rod 14 to an offset crankshaft 16 which rotates in response to the up and down motion of the piston(s) 10. Most engines for automobile use have four, six, or eight cylinders. In the past, there have been automobiles with twelve and sixteen cylinders and at least one Japanese auto maker is presently selling a three cylinder engine car.

In the typical prior art four-cycle engine as depicted in FIGS. 1–4, there is an oil sump 18 which contains a quantity of lubricating oil. The oil bathes the crankshaft 16, splashes up on the sidewalls of the cylinder 12, and is positively pumped through the engine to lubricate other moving parts to reduce friction, heating, and wear. There is also a cylinder head covering the top of the cylinder 12. The cylinder head 20 and engine block containing the cylinder(s) 12 are typically water-cooled to protect metal components which will erode or even melt if temperatures are allowed to get too high. The hot water produced typically provides a heat source for heating the automobile in the winter months in colder climates.

Figure 1:
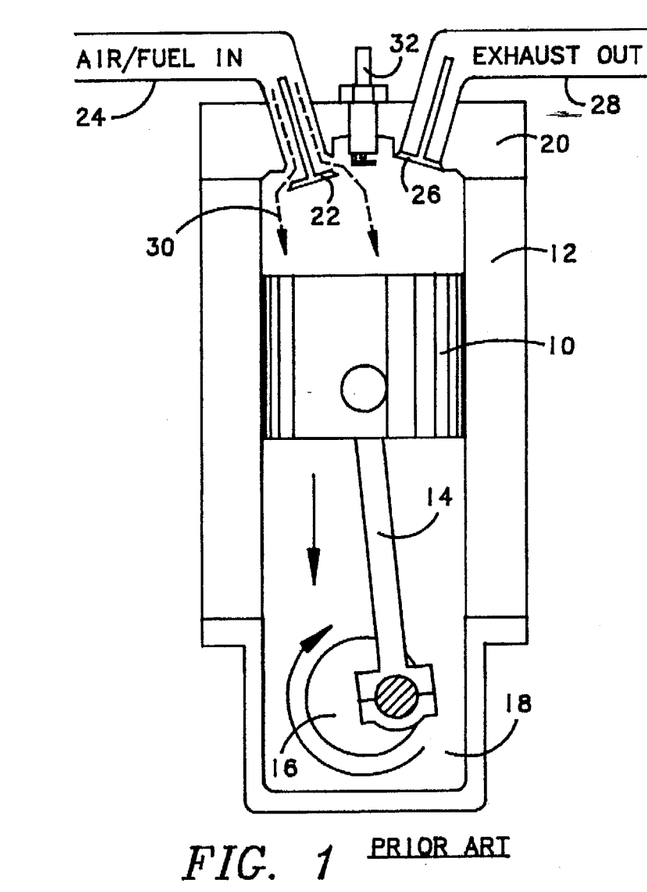
FIG. 1 is a simplified partially cutaway drawing of a prior art four-cycle engine during its intake stroke.
Figure 2:
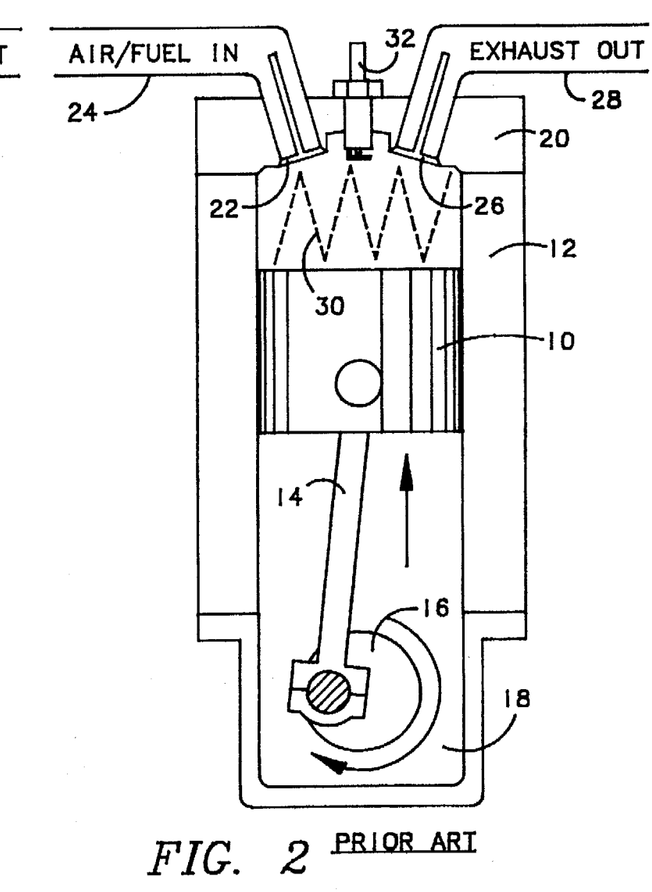
FIG. 2 is a simplified partially cutaway drawing of a prior art four-cycle engine during its compression stroke.
Figure 3:
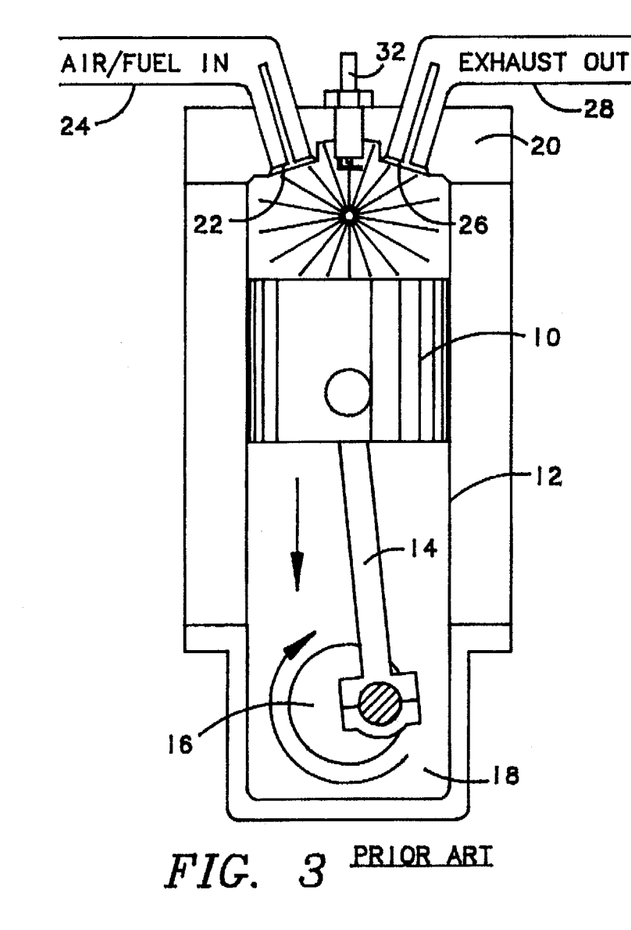
FIG. 3 is a simplified partially cutaway drawing of a prior art four-cycle engine during its power stroke.
Figure 4:
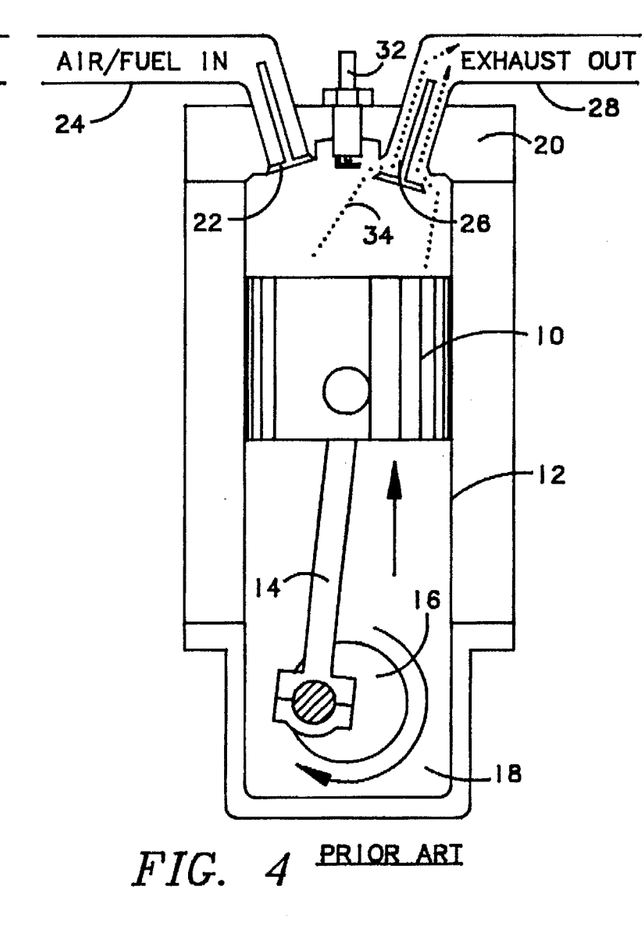
FIG. 4 is a simplified partially cutaway drawing of a prior art four-cycle engine during its exhaust stroke.

The cylinder head 20 for each cylinder 12 contains an intake valve 22 connected to an intake manifold 24 and an exhaust valve 26 connected to an exhaust 28. Air and fuel in a vaporized form 30 are introduced into the intake manifold with a carburetor, fuel injector system, or the like. When the intake valve 22 is opened during the down-stroke of the piston 10 as depicted in FIG. 1, the partial vacuum created draws the air/fuel mixture 30 into the combustion chamber of the cylinder 12 between the piston 10 and the cylinder head 20. At or near the bottom of the piston stroke, the intake valve 22 is closed and the air/fuel mixture is compressed by the piston 10 moving upward as depicted in FIG. 2. Near the top of the compression stroke, a spark plug 32 in the cylinder head 20 is discharged with a high voltage spark to ignite the compressed air/fuel mixture and cause it to burn and impart its energy to the piston 10 in its downward power stroke as depicted in FIG. 3. The exhaust valve 26 is then opened so that the burned exhaust gases 34 are forced out the exhaust manifold 28 by the upward movement of the piston 10 as depicted in FIG. 4.

If the four-cycle engine of FIGS. 1–4 could operate under ideal conditions (i.e. a theoretical thermodynamic cycle), all the energy of the air/fuel mixture would be transferred to the piston in the form of work. Unfortunately, the conditions are not ideal due to material limitations (melting point of metal, thermal expansion, etc.), mechanical limitations (fixed valve and crank dining, friction, assembly tolerances), and energy lost to the cooling system. If the temperature of the combustion chamber could be raised by reducing the heat lost to the cooling system (adiabatic engine), the inefficiencies could be reduced. However, because of the water cooling system and the potential friction and thermal expansion problems associated with the higher temperature pistons, the internal temperatures cannot be high enough.

A supercharger or turbocharger can be added to inject the air/fuel under pressure. This can be used to force more fuel and air into the combustion chamber which results in more energy (higher temperatures and pressures) for a given displacement engine. In any event, however, the engine will typically run hotter and have a reduced life. Thus, a supercharger or turbocharger is more likely to be employed to increase engine performance rather than fuel efficiency.

Since the engine does not operate at peak theoretical efficiency, there are pollutants which must be removed to produce emissions which meet required (i.e., government regulated) standards. Typically, the pollutants are removed by a separate catalytic converter (not shown) placed down stream from the exhaust valve 26 in the exhaust system following the exhaust manifold 28.

Figure 5:
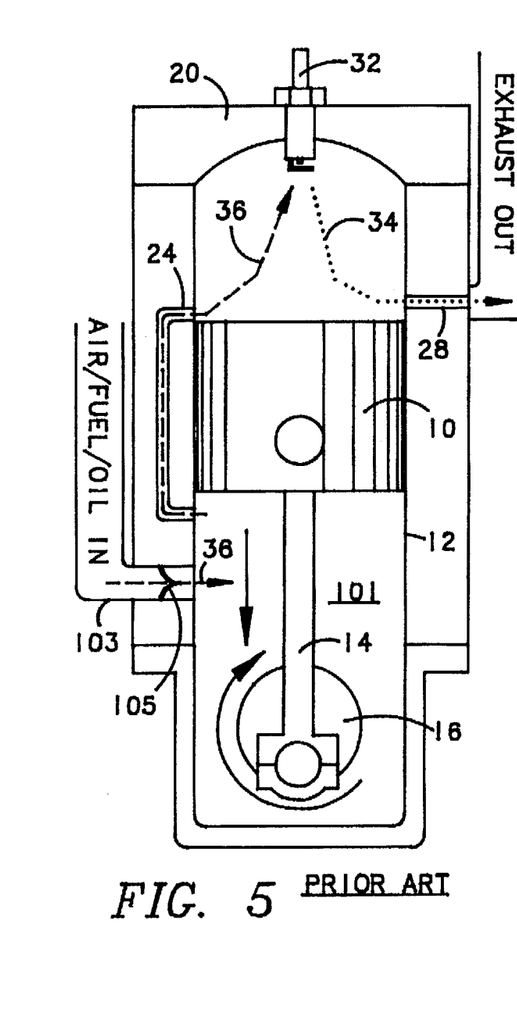
FIG. 5 is a simplified partially cutaway drawing of a prior art two-cycle engine at the bottom of its power stroke showing exhaust gases being expelled and an air/fuel/oil mixture being input to the cylinder.
Figure 6:
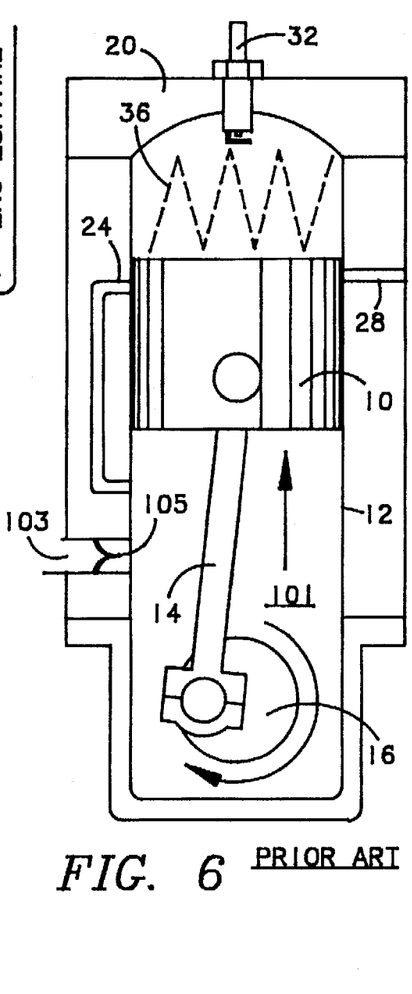
FIG. 6 is a simplified partially cutaway drawing of a prior art two-cycle engine during its compression stroke.
Figure 7:
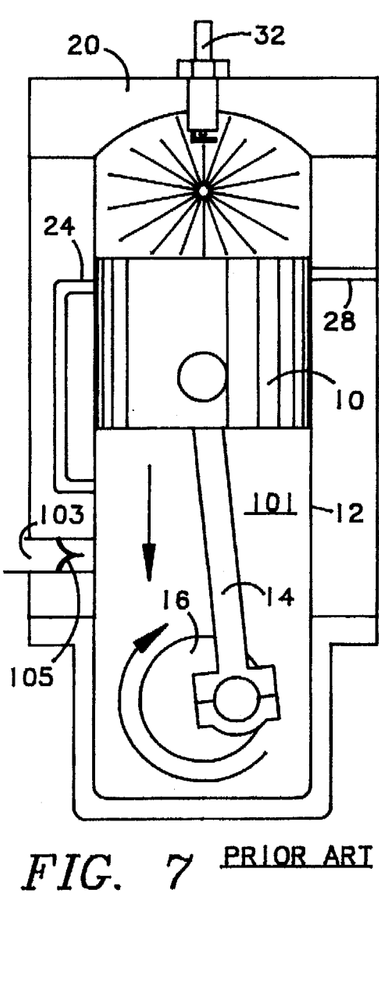
FIG. 7 is a simplified partially cutaway drawing of a prior art two-cycle engine during its power stroke.

In a typical two-cycle engine as depicted in FIGS. 5 through 7, a mixture of air/fuel/oil 36 enters the crankcase 101 via a port 103 with a one-way valve 105. The pressure differential created by the upward (compression 36) stroke of the piston 10 draws the mixture in. As the piston 10 approaches top dead center, the mixture in the cylinder 12 is ignited by a spark plug 32 thus creating an increase in pressure from the combustion process. This pressure rise forces the piston downward (power stroke) which in turn introduces positive work into the crank shaft 16 via the piston connecting rod 14. As the piston approaches bottom dead center, it travels past and thereby opens the exhaust port 28 in the cylinder wall 12, which allows the products of combustion to exit. Shortly after the exhaust port opens, the piston passes by, thus opening, the cylinder 12 intake port 24. As the port opens, a fresh charge of fuel air mixture is forced into the cylinder 12 from the crankcase by the pressure differential created in the crankcase from downward travel of the piston 10. The process then repeats providing one power stroke every revolution of the crank, unlike it's four stroke counterpart. Since there is no sump and circulating oil as in the four-cycle engine, the lubricating oil must be mixed with the fuel or be separately injected into the mixture 36, which makes the cost of operation higher and increases the exhaust emissions. In addition, the inherent intake/exhaust porting of the two-stoke engine dictates that both the intake and exhaust ports must be open for some duration at the same time, thereby allowing a portion of the raw fuel/air mixture to flow directly out the exhaust, which dramatically increases hydrocarbon emissions and decreases fuel efficiency. The inherent nature of the two-cycle design provides for minimal moving parts (thereby resulting in reduced manufacture ring costs), high specific power, and high hydrocarbon emissions. Therefore, their practical and accepted use tends to be in products such as small utility engines (lawn and garden equipment), lightweight (typically off-road) motorcycles, outboard marine engines, and the like. As mentioned in passing above, heat, friction, and metal deterioration are problems of internal combustion engines that must be factored into engine design. The more efficient the burn, the hotter the internal temperatures generated. In the prior art, attempts have been made to coat critical metal parts with ceramic material in an effort to make them more resistant to heat deterioration and to improve the heat retention of the engine. For example, heat and its effects are much more important to consider with newer engines having cylinders and pistons formed of aluminum than older engines employing cast iron. The so called "aluminum engines" offer many benefits, but heat resistance is not one of them.

Figure 8:
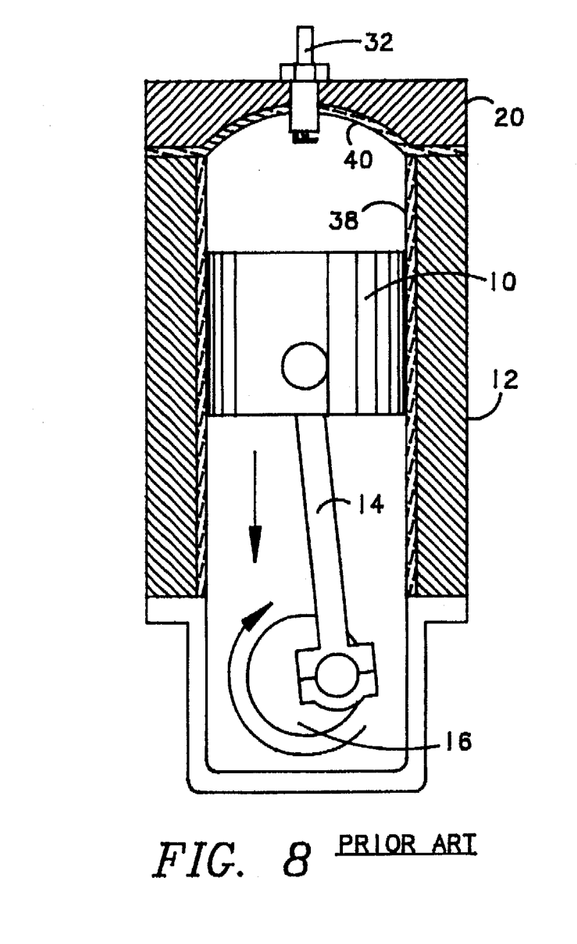
FIG. 8 is a simplified partially cutaway drawing of a prior art engine depicting the use of a ceramic lining on the cylinder walls and the cylinder head to increase thermal resistance.

As shown in FIG. 8, it is known to use a monolithic ceramic sleeve 38 to line the walls of the cylinder 12 and the inside of the cylinder head 20 with a monolithic ceramic liner 40 in an alcohol fueled two-stroke engine.

Figure 9:
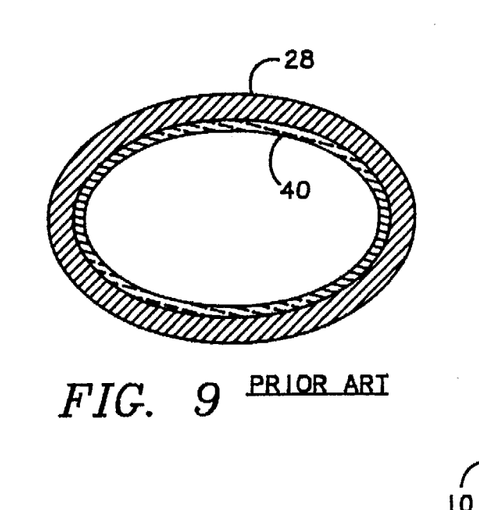
FIG. 9 is a simplified cutaway drawing of a prior art intake or exhaust manifold for an engine depicting the use of a ceramic lining to increase thermal resistance.
Figure 10:
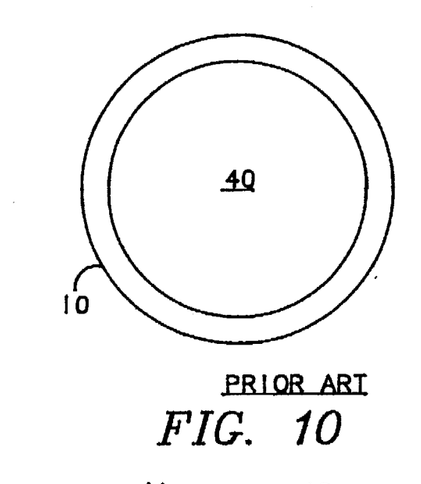
FIG. 10 is a top view drawing of a prior art piston for an engine depicting the use of a ceramic lining on the center of the piston head to increase thermal resistance.
Figure 11:
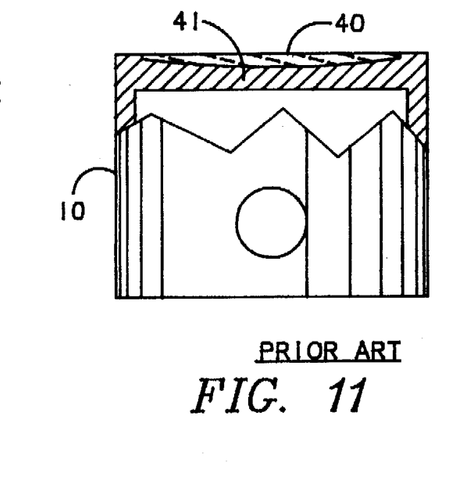
FIG. 11 is a simplified partially cutaway drawing of the piston head of FIG. 10.

The inside of exhaust manifolds 28 have also had a ceramic liner 40 applied thereto in the prior art, as depicted in FIG. 9, as there is a tendency for hot exhaust gases to generate excessive heat in areas where their path bends. Such "hot spots" can burn through or melt the metal or cause it to change physical structure to the point that there is a hole formed requiring replacement of the entire manifold. Pistons can literally have holes burned through their top 41 at the fuel ignition point. To counteract this, the prior art suggests having a monolithic ceramic liner or insert 40 in the center of the piston 10 as depicted in FIGS. 10 and 11.

Nowhere in the prior art known to the applicants herein is a structural fiber reinforced ceramic matrix composite (FRCMC) material employed for engine parts in sliding contact with one another.

Nowhere in the prior art known to the applicants herein is a structural FRCMC employed for an entire engine part.

Wherefore, it is an object of the present invention to provide a practical automobile internal combustion engine that is simple in operation and cost competitive to manufacture.

It is still another object of the present invention to provide a two-cycle automobile internal combustion engine that has high fuel efficiency.

It is yet another object of the present invention to provide a two-cycle automobile internal combustion engine that has low pollutant production.

It is a further object of the present invention to provide a two-cycle automobile internal combustion engine employing an all FRCMC combustion chamber dome, cylinder(s) and piston(s), and which can be fueled by gasoline, diesel or alcohol fuels.

It is a still further object of the present invention to provide an automobile internal combustion engine employing FRCMC parts in sliding contact with one another (e.g., sleeve and piston).

It is a yet further object of the present invention to provide structural FRCMC materials and methods of manufacture which are breakage resistant and highly suitable for use in the construction of components used in a high temperature internal combustion engine.

Other objects and benefits of this invention will become apparent from the description which follows hereinafter when read in conjunction with the drawing figures which accompany it.

SUMMARY

The foregoing objects have been achieved by the internal combustion engine of the present invention comprising, a block having at least one cylinder bore therein, the cylinder bore having sidewalls carrying a liner of a structural fiber reinforced ceramic matrix composite material; and, a piston of the structural fiber reinforced ceramic matrix composite material disposed in sealed sliding relationship within the cylinder bore.

In the preferred embodiment, there is a cylinder head sealing a top end of the cylinder bore to form a closed combustion chamber in combination with the piston. The cylinder head has the structural fiber reinforced ceramic matrix composite material disposed on an inner surface thereof facing the combustion chamber.

In an implementation of the present invention as a two-cycle engine, there are also, spark plug means for igniting a fuel/air mixture in the combustion chamber; fuel pump means for supplying fuel under pressure; fuel injector means connected to the fuel pump means for injecting fuel into the combustion chamber; an intake bore through the block in the sidewalls and the liner of the cylinder bore; a source of pressurized air connected to the intake bore; and, an exhaust bore through the block in the sidewalls and the liner of the cylinder bore, the intake bore and the exhaust bore being covered and uncovered by the piston as the piston moves longitudinally within the cylinder bore, the intake bore and the exhaust bore being positioned so that when the piston is adjacent a bottom position of sliding longitudinal movement within the cylinder bore source of pressurized air forces the pressurized air into the combustion chamber and out the exhaust bore and when the piston moves away from the bottom position of sliding longitudinal movement within the cylinder bore the intake bore and the exhaust bore are closed and sealed by the piston.

Contrary to prior art two-cycle engines, the engine of this invention includes an oil sump lubricating system thereby eliminating the need to mix oil with the fuel or inject oil into the cylinder with the fuel/air mixture.

More concisely, the preferred two-cycle engine of this invention comprises an externally scavenged intake system and an oil sump lubricating system.

The method of forming breakage resistant structural fiber reinforced ceramic matrix composite material parts for an internal combustion engine according to the present invention comprises the steps of, coating fibers of a generic fiber system with an interfacing material which will prevent adherence of a pre-ceramic polymer resin from adhering to the fibers; mixing the coated fibers with a pre-ceramic polymer resin; forming the resin containing the coated fibers into a desired part; and, firing the part at a temperature and for a time which converts the polymer resin to a ceramic.

The preferred method includes selecting the appropriate resin from two basic groups consisting of polymer-derived ceramic resins and cementatous ceramic resins that have been modified to emulate processing techniques employed for the fabrication of polymer composite hardware. These resins include Silicon-Carboxyl, Alumina Silicate and Monoaluminum Phosphate (also known as Monoalumino Phosphate).

It also includes selecting the generic fiber system from the groups comprising Alumina, Altex, Nextel 312, Nextel 440, Nextel 510, Nextel 550, Silicon Nitride, Silicon Carbide, HPZ, Graphite, Carbon, and Peat.

It additionally includes selecting the interfacing material from the group comprising Carbon, Silicon Nitride, Silicon Carboxide, Silicon Carbide, and Boron Nitride or multiple layers of one or more of the above interfacial materials.

DESCRIPTION OF THE PREFERRED EMBODIMENT

Figure 12:
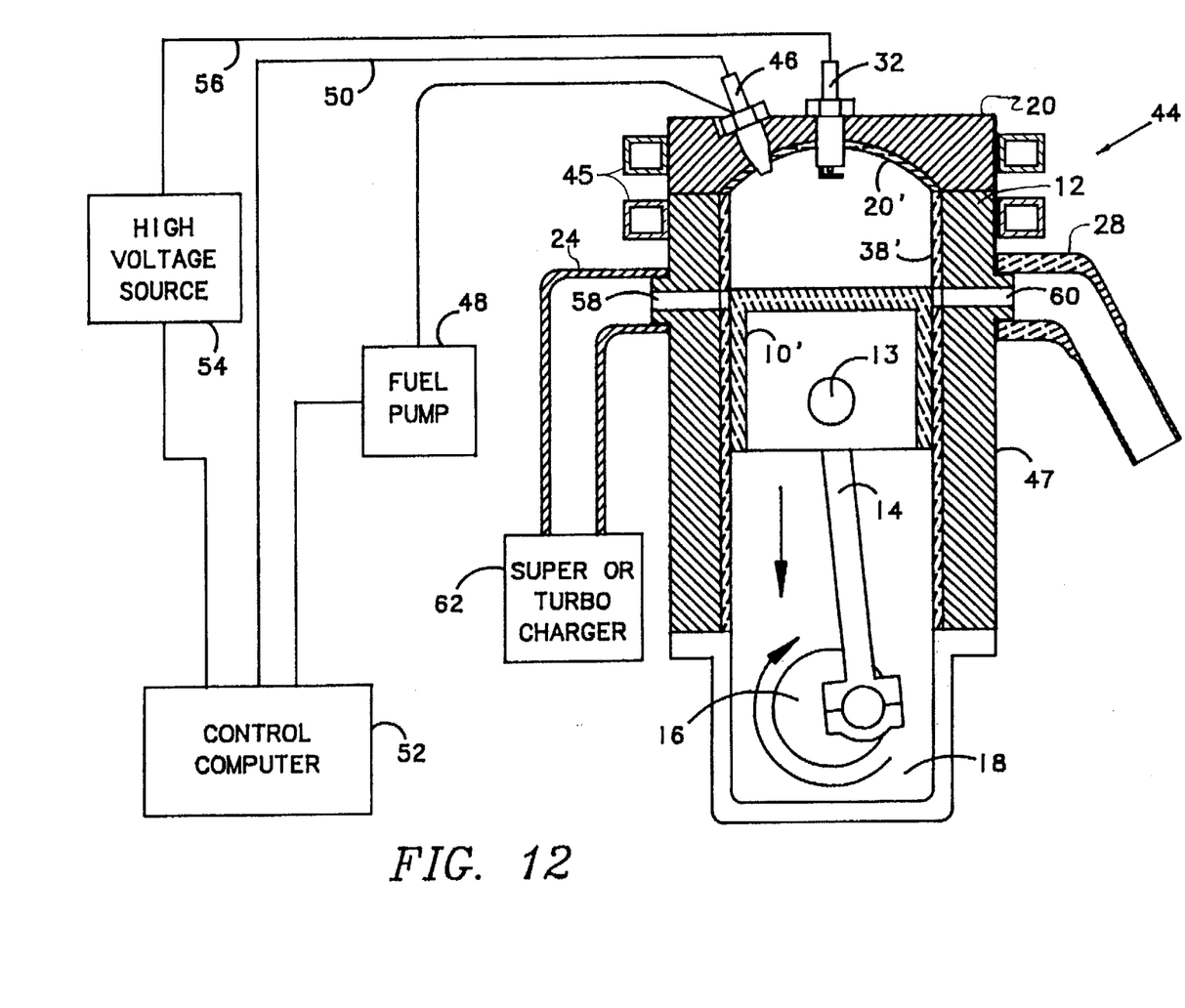
FIG. 12 is a combined simplified partially cutaway drawing and functional block diagram of a two-cycle engine according to the present invention employing a ceramic head or ceramic lined head.

The components (sleeve, piston, and headliner) for the present invention as described hereinafter are presently under development in an externally-scavenged, automotive-sized two-cycle engine. The engine presently under development is a three cylinder engine. The number of cylinders, however, is not critical to the present invention. The engine 44 as depicted in FIG. 12 in simplified partially cutaway and combined functional block diagram form is a two-cycle engine in which the fuel is directly injected into the combustion chamber and employs an externally scavenged intake system along with an oil sump lubricating approach at 18 as normally employed in four-cycle engines. A means 45 for transferring heat away from the cylinder can be used, such as a traditional water jacket cooling approach for the cylinder block and head result in low external engine metal surface temperatures for safe installation in conventional automobile designs. Additionally, hot water is required for heating the passenger compartment on current automobile platforms. The all ceramic construction for critical components (all surfaces exposed to the combustion process) allows the wall surfaces adjacent to the combustion gases to run much hotter than prior art engines for increased fuel efficiency and decreased pollutant production. As opposed to the prior art which employed a monolithic ceramic material, the present invention employs structural fiber reinforced ceramic matrix composite (FRCMC) materials of a kind well known to those of ordinary skill in the art. It should be noted, however, that FRCMC materials are quite new and heretofore have been employed only for structural uses such as aircraft hot structure and the like. Nowhere in the prior art or literature associated with the FRCMC materials as provided by the manufacturer thereof is it taught or suggested that FRCMC materials could be used for such uses as employed in the present invention. In particular, there is no belief in the prior art that FRCMC materials can be used in sliding contact with one another because of their observed tendency to quickly self-destruct when rubbed together. Also, ceramic materials made according to prior art techniques as taught by the manufacturers thereof are strain intolerant and notch sensitive, thus inhibiting successful rate manufacturability.

According to the present invention and as employed in the description of the engine which follows hereinafter, engine parts such as pistons, piston sleeves, power heads, power head liners, and the like are made from a FRCMC structure that eliminates the strain limitations and notch sensitivities of conventional prior art ceramic structures. The FRCMC of this invention employs either of two pre-ceramic resins or a modified cementatous resin which emulates processing techniques of polymer composites which are commercially available such as Silicon-Carboxyl resin (sold by Allied-Signal under the trade name Blackglas), Alumina Silicate Resin (sold by Applied Poleramics under the product designation CO2) or Monoaluminum Phosphate (also known as Monoalumino Phosphate) resin, combined with a generic fiber system such as, but not limited to, Alumina, Altex, Nextel 312, Nextel 440, Nextel 510, Nextel 550, Silicon Nitride, Silicon Carbide, HPZ, Graphite, Carbon, and Peat. To accomplish the objectives of the present invention, the fiber system is first coated to a few microns thickness with an interface material such as, but not limited to, Carbon, Silicon Nitride, Silicon Carbide, or Boron Nitride or multiple layers of one or more of these interfacial materials. The interface material prevents the resin from adhering directly to the fibers of the fiber system. Thus, when the resin has become a ceramic, there is a weak disbond bond layer between the ceramic matrix and the fibers imparting the desired qualities to the final FRCMC.

Thus, according to the present invention, the steps of constructing a breakage-resistant engine part comprise applying the interface material to the fiber system, mixing the interface coated fiber system with the resin, forming the part (as per best practices used in the fabrication of structural polymer composite hardware) with the resin mixture, and firing the resultant part at a temperature in the neighborhood of 1,800° F. (or as otherwise as suggested by the manufacturer for the specific resin employed) to transform the resin into a ceramic. The final product's mechanical properties can be tailored to the specific application. For example, mechanical strength and heat rejection requirements will vary from engine design to engine design. This tailoring can be achieved by fiber and interface coating selection, composite fiber architecture, and wall thickness. These aspects per so, form no part of the novelty of the present invention and can be determined by those of ordinary skill in the art from performance data on the FRCMC material employing techniques well known and understood.

In the engine being constructed and tested by the inventors herein, the cylinder head 20 is a water cooled metal assembly lined with a structural ceramic (FRCMC) layer 20' which is integrally cast within or bonded to it. The cylinders 12 of the metal engine block 47 have structural FRCMC liners 38' therein. It should be noted at this point that metal is used for those parts not subjected to extreme temperature and ceramic is employed for those parts requiring heat resistance. In that spirit, therefore, the pistons 10' are structural FRCMC while the wrist pin 13, connecting rod 14 and crankshaft 16 are metal. It should also be noted in this regard that where dissimilar metal-to-metal fits are involved such as an aluminum piston within a cast iron cylinder, much greater tolerances must be employed to allow for unequal expansion and contraction of the parts due to heat and cold. As well known and understood by those of ordinary skill in the art, closer fits mean less chance for blow-by and cold-start pollutant emissions. On the other hand, closer fits mean more opportunity for engine seizure. Since engine seizure is such a major and costly calamity, designers typically opt for minimizing and hopefully eliminating the chance of seizure in favor of lower operating efficiencies. Since the coefficient of thermal expansion of ceramic parts is much lower than for metals, not only do they resist higher temperatures, but additionally, tolerances can be kept much closer without excessive danger of engine seizure.

The cylinder head 20 at each cylinder 12 has a spark plug 32 along with a fuel injector 46 which injects fuel under pressure from the fuel pump 48 when it receives an inject signal on the electrical control line 50. Thus, the engine 44 is directly injected in the manner of a diesel engine and, in fact, can be operated with any number of fuels including diesel fuel, gasoline, and alcohol. The fuel pump 48 is a high pressure pump capable of supplying fuel at pressures greater than 200 pounds per square inch. The fuel pressure at the fuel injectors is controlled by a pressure regulating valve (not shown) that receives control signals from the control computer. An optimized fuel pressure map would be programmed into the control computer 52 which also controls the injection signals on lines 50 and the firing signals to the high voltage source 54 providing the high voltage on lines 56 to the spark plugs 32.

Each cylinder 12 has intake ports 58 and an exhaust port 60, which are exposed when the piston 10' reaches a given location during its stroke. The exact location of the ports 58, 60 relative to the top and bottom of the piston stroke control the mechanical "timing" of the engine similarly to the way a cam shaft controls the valve "timing" in a four-cycle engine. The techniques for determining such positioning are well known to those of ordinary skill in the art of engine design. The fuel injection duration, spark advance, and fuel injection advance are controlled by the engine computer. The intake ports 58 are connected to a supercharger or turbocharger 62 while the exhaust port 60 is connected to an exhaust manifold 28. The exhaust manifold 28 is preferably, but not necessarily, of all-ceramic construction so as to be able to resist the hot exhaust gases produced by the engine 44. However, operational limitations imposed by safety regulations and other equipment installed in the engine compartment as well as maintenance procedures may dictate using a ceramic lined metal exhaust manifold. The unique and highly efficient operation of the engine 44 will now be described in detail with reference to FIGS. 13–16.

Figure 13:
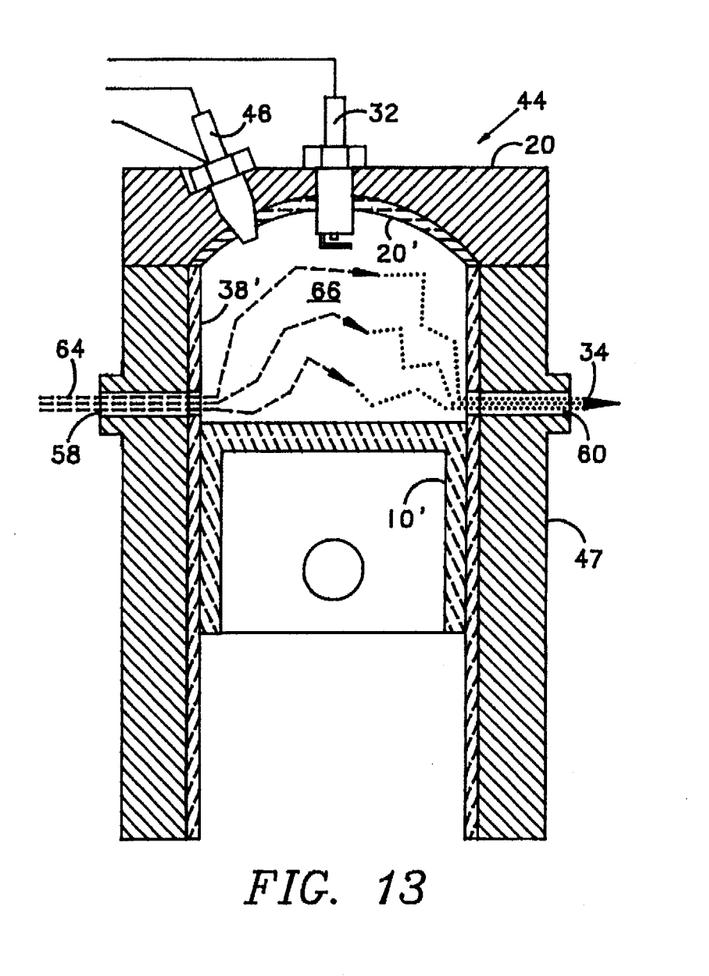
FIG. 13 is a simplified partially cutaway drawing of the two-cycle engine of FIG. 12 at the bottom of its power stroke showing exhaust gases being positively expelled by pressurized air.

As depicted in FIG. 13, which represents the bottom of the engine's stroke following a power or combustion stroke, the inlet port 58 and outlet port 60 are uncovered by the piston 10'. Pressurized air 64 from the supercharger or turbocharger 62 enters the combustion chamber 66 and forces the residual exhaust gases 34 from the combustion chamber 66, leaving the combustion chamber 66 filled only with air 64 under a slight pressure.

Figure 14:
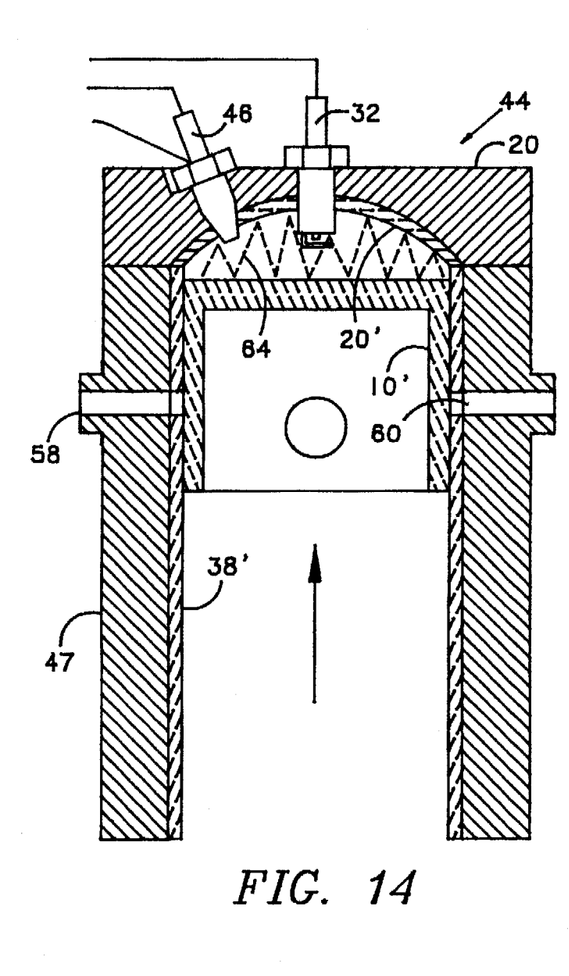
FIG. 14 is a simplified partially cutaway drawing of the two-cycle engine of FIG. 12 during its compression stroke.

As shown in FIG. 14, as the piston 10' travels upward, the intake ports 58 and exhaust port 60 are covered by the piston 10' causing the combustion chamber 66 to be a closed chamber which decreases in size as the piston 10' travels toward the cylinder head 20'. Thus, the air 64 trapped therein is compressed to a fraction of its prior volume.

Figure 15:
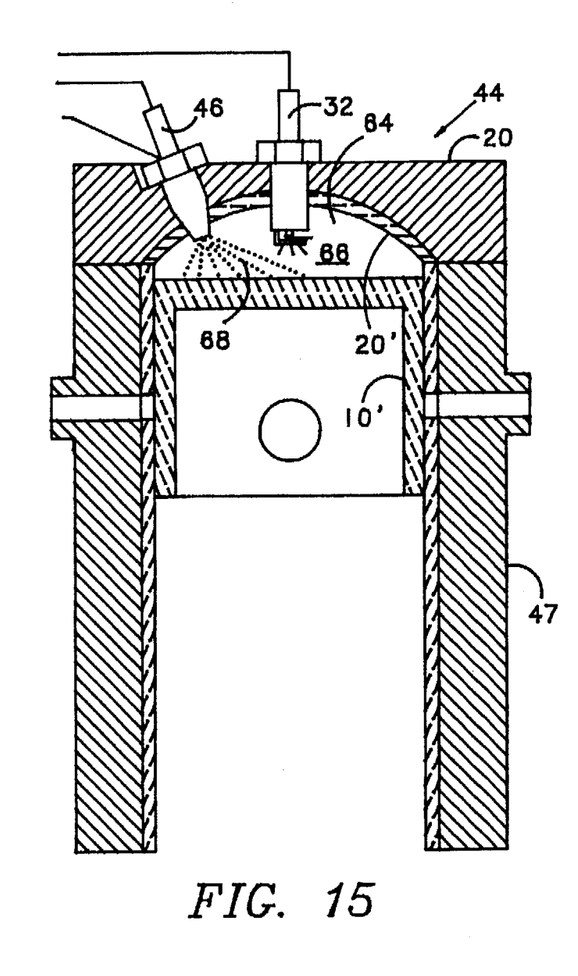
FIG. 15 is a simplified partially cutaway drawing of the two-cycle engine of FIG. 12 showing the fuel being injected and ignited to initiate power stroke.
Figure 16:
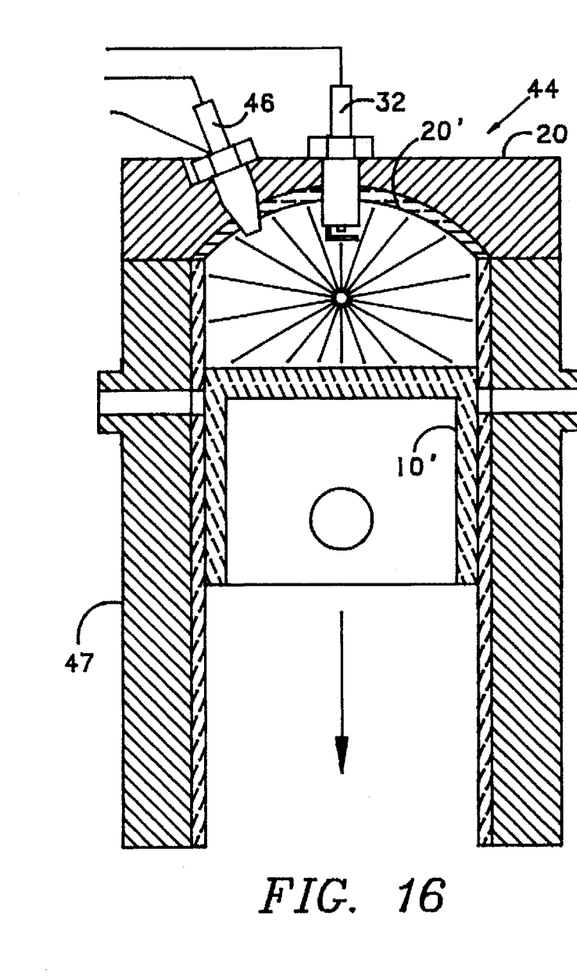
FIG. 16 is a simplified partially cutaway drawing of the two-cycle engine of FIG. 12 during its power stroke.

At the proper moment as determined from positional feed-back (not shown) from the engine accomplished in any of well known prior art techniques, the control computer 52 sends the inject signal to the fuel injector 46 thereby causing the fuel injector 46 to inject a spray of fuel 68 into the combustion chamber 66 to mix with the air 64 forming a highly combustible mixture. The fire signal to the high voltage source 54 causes it to send a high voltage signal to the spark plug 32 as depicted in FIG. 15, which ignites the fuel/air mixture to produce the power stroke as depicted in FIG. 16. Because the combustion chamber 66 is completely fabricated from structural FRCMC material, the operating temperature of the combustion chamber 66 can be, and is, much hotter than in prior art internal combustion engines. This results in more complete burning and more rapid burning of the fuel 68 with attendant benefits of higher fuel efficiency and reduced pollutant emissions, as desired. As a result of the more rapid and complete burning, the engine is able to convert more of the chemical potential energy of the fuel into work. Additionally, the insulative characteristics of the FRCMC components reduce the rate of energy transfer from the combustion gasses to the cooled metal block and head, which reduces the energy lost to the cooling system. This makes more of the energy released by the fuel available for the generation of work. The combination of the higher wall/surface temperatures in the combustion chamber and the reduced heat transfer through the liners results in a much higher efficiency engine.

It should also be appreciated from the foregoing description that the all-FRCMC piston 10' is in sliding fit relationship to the FRCMC liner 38'. Because of the lower thermal expansion characteristics of the FRCMC material, the tolerances between the piston 10' and the liner 38' can be kept much closer without causing engine seizure, even in the presence of the much higher operating temperatures employed. This results in lower blow-by, reduced cold start pollutant emissions, and greater fuel efficiency.

Novel techniques for allowing the sliding contact between the piston 10' and the liner 38' with a greatly reduced coefficient of friction for reduced deterioration of the parts are addressed in a co-pending application entitled REDUCING WEAR BETWEEN STRUCTURAL FIBER REINFORCED CERAMIC MATRIX COMPOSITE AUTOMOTIVE ENGINE PARTS IN SLIDING CONTACTING RELATIONSHIP, Ser. No. 08/515,926, filed on Aug. 16, 1995 and assigned to the common assignee of this invention the teachings of which are incorporated herein by reference.

Methods and apparatus for sealing the clearance between the piston 10' and the liner 38' are addressed in a co-pending application entitled PISTON RINGS FOR AN AUTOMOTIVE ENGINE EMPLOYING STRUCTURAL FIBER REINFORCED CERAMIC MATRIX COMPOSITE PISTONS AND CYLINDER LINERS, Ser. No. 08/515,924, filed on Aug. 16, 1995 herewith and assigned to the common assignee of this invention the teachings of which are incorporated herein by reference.

While the use of FRCMC components in an internal combustion engine as described herein before has been described with particular emphasis on a two-cycle automotive engine presently under development and testing, as those skilled in the art will readily recognize and appreciate, similar benefits in the reduction of pollutants and the increase in fuel efficiency can be achieved in a four-cycle engine as well as using the same techniques.

Example: Fabrication of a FRCMC Cylinder Sleeve

1. Fabricate or purchase a cylindrical preform of the requisite size (there are a number of U.S. vendors that weave composite preforms for composite applications) from one the fibers identified herein. In this example, the preform was hand layed-up by the inventors.

2. The preform then had a fiber interface coating applied to it as described herein according to best industry standards. Note that the assignee of this application, Northrop Corporation, currently has a number of patents on the application of interface coatings, the teachings of which are incorporated herein by reference. Also, Allied Signal or Synterials are commercial companies which will apply an interface coating as a purchased service.

3. The cylindrical preform was then placed in a mold and the mold closed and sealed around it.

4. Blackglas resin was then forced through the mold to fill the mold and saturate the preform.

5. The mold with the enclosed preform and resin mixture was then heated as per the following cycle:
   A) Ramp from ambient to 150° F. at 2.7°/minute
   B) Hold at 150° F. for 30 minutes
   C) Ramp at 1.7°/minute to 300° F.
   D) Hold at 300° F. for 60 minutes
   E) Cool at 1.2°/minute until temperature is below 140° F. for part demolding It should be noted that there are a variety of heat-up cycle definitions which will create usable hardware and the foregoing is by way of one example only and not intended to be exclusive.

6. Upon cool-down of the mold, the mold was disassembled and the polymer composite component removed from the mold for pyrolysis.

NOTE: The previous six steps identify a Resin Transfer Molding (RTM) approach to preparing the polymer composite component. Other applicable approaches to create the same part are Hand-Lay-up, Pultrusion, Filament Winding, Toe Placement, or Short Fiber Injection. These are all valid Polymer Composite Manufacturing Techniques to be included within the scope and spirit of the present invention and the claims appended hereto. These various techniques are not claimed to be inventive of the inventors herein in and of themselves and only the total method being described and claimed is novel to these inventors and this application.

7. The polymer composite component was then pyrolized. In this regard, fabrication of a sealable container, such as a stainless steel box, capable of withstanding 1900° F. is required for the pyrolysis cycle in a standard furnace. In the alternative, an inert gas furnace could be used if available. The box should have two tubing connections, one on the bottom and one on the top to allow the box to be flooded with an inert gas. In this example, the sleeve was placed in the box, the box placed in a standard furnace, stainless steel tubing was connected to the lower connector on the box and to a supply of high purity argon. Any equivalent inert gas could, of course, be used. The argon was allowed to flow into the box, and out the top vent at a rate of 5–10 SCFH for the entire heat cycle, thus assuring the sleeve was totally bathed in an argon environment. The furnace was closed and fired on the following basis:
   A) Ramp to 300° F. at 223°/hour
   B) Ramp to 900° F. at 43°/hour
   C) Ramp to 1400° F. at 20°/hour
   D) Ramp to 1600° F. at 50°/hour
   E) Hold at 1600° F. for 4 hours
   F) Ramp to 77° F. at –125°/hour Again, there are a variety of heating schedules other than this one, given by way of example only, which will yield usable hardware.

Wherefore, having thus described the present invention, what is claimed is:

1. A ceramic cylinder head for an internal combustion engine comprising:
   a) a cylinder head comprised of a generic fiber system having disposed throughout a pre-ceramic polymer resin in its ceramic state where said pre-ceramic polymer resin consists of a modified cementatous resin containing organic binders derived by emulated polymer composite processing techniques and,
   b) a heat relocation device for transferring heat away from a top surface of the cylinder head to maintain the cylinder head below a threshold temperature.

2. The ceramic cylinder head of claim 1 wherein said means for transferring heat away from a top surface of the cylinder head comprises:
   radiating fins formed in said top surface of the cylinder head for transferring heat to air surrounding said fins.

3. The ceramic cylinder head of claim 1 wherein said means for transferring heat from a top surface of the cylinder head comprises:
   a metal heat sink attached to said top surface, said heat sink including radiating fins for transferring heat to air surrounding said fins.

4. The ceramic cylinder head of claim 1 wherein said means for transferring heat from a top surface of the cylinder head comprises:
   a metal water jacket formed onto said top surface, said water jacket having an inlet pipe and an outlet pipe for passing engine coolant therethrough.

5. The ceramic cylinder head of claim 1 wherein said means for transferring heat from a top surface of the cylinder head comprises:
   a metal water jacket adhesively bonded or mechanically attached onto said top surface, said water jacket having an inlet pipe and an outlet pipe for passing engine coolant therethrough.

6. The ceramic cylinder head of claim 1 wherein:
   said means for transferring heat from a top surface of the cylinder head includes means for heating a fluid used in a passenger compartment heating system.

7. The ceramic cylinder head of claim 1 and additionally comprising:
   an errosion-resistant coating disposed over a combustion facing side of said cylinder head whereby endurance capabilities of the cylinder head are enhanced.

8. A ceramic cylinder head for an internal combustion engine comprising:
   a) a cylinder head made of a generic fiber system having disposed throughout a pre-ceramic polymer resin in its ceramic state where said pre-ceramic polymer resin consists of a modified cementatous resin containing organic binders and made from emulated polymer composite processing techniques; and, b) a metal water jacket formed onto a top surface of said cylinder head, said water jacket having an inlet pipe and an outlet pipe for passing engine coolant therethrough so that heat is transferred away from a top surface of the cylinder head to maintain the cylinder head below a threshold temperature.

9. The ceramic cylinder head of claim 8 and additionally comprising:

an erosion-resistant coating disposed over a combustion facing side of said cylinder head whereby endurance capabilities of the cylinder head are enhanced.

10. A ceramic cylinder head for an internal combustion engine comprising:

a) a cylinder head made of a generic fiber system having disposed throughout a pre-ceramic polymer resin in its ceramic state where said pre-ceramic polymer resin consists of a modified cementatous resin containing organic binders and derived by emulated polymer composite processing techniques; and, b) a metal water jacket adhesively bonded or mechanically attached to a top surface of said cylinder head, said water jacket having an inlet pipe and an outlet pipe for passing engine coolant therethrough so that heat is transferred away from a top surface of the cylinder head to maintain the cylinder head below a threshold temperature.

11. The ceramic cylinder head of claim 10 and additionally comprising:

an erosion-resistant coating disposed over a combustion facing side of said cylinder head whereby endurance capabilities of the cylinder head are enhanced.

12. A ceramic lined cylinder head for an internal combustion engine comprising:

a) a cylinder liner head liner having a combustion facing side and being of a generic fiber system having disposed throughout a pre-ceramic polymer resin in its ceramic state where said pre-ceramic polymer resin consists of a modified cementatous resin containing organic binders and derived by emulated polymer composite processing techniques: and, b) a metal cylinder head disposed over a top surface of said cylinder head liner, said metal cylinder head including a heat relocation device for transferring heat away from said top surface of said cylinder head liner to maintain the cylinder head below a threshold temperature.

13. The ceramic lined cylinder head of claim 12 wherein said means for transferring heat away from said top surface of said cylinder head liner comprises:

radiating fins formed in a top surface of said metal cylinder head for transferring heat to air surrounding said fins.

14. The ceramic lined cylinder head of claim 12 wherein said means for transferring heat away from said top surface of said cylinder head liner comprises:

a metal heat sink attached to a top surface of said metal cylinder head, said metal heat sink including radiating fins for transferring heat to air surrounding said fins.

15. The ceramic lined cylinder head of claim 12 wherein said means for transferring heat away from said top surface of said cylinder head liner comprises:

a metal water jacket formed into said metal cylinder head, said water jacket having an inlet pipe and an outlet pipe for passing engine coolant therethrough.

16. The ceramic lined cylinder head of claim 12 wherein:

said means for transferring heat away from said top surface of said cylinder head liner includes means for heating a fluid used in a passenger compartment heating system.

17. The ceramic lined cylinder head of claim 12 and additionally comprising:

an erosion-resistant coating disposed over said combustion facing side of said cylinder head liner whereby endurance capabilities of the cylinder head liner are enhanced.

\* \* \* \* \*